United States Patent
Fronek et al.

(10) Patent No.: US 7,855,647 B2
(45) Date of Patent: Dec. 21, 2010

(54) FLAME RESISTANT RFID TAG AND METHOD OF MAKING THE SAME

(75) Inventors: Daniel R. Fronek, Woodbury, MN (US); Michael D. Swan, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 803 days.

(21) Appl. No.: 11/836,209

(22) Filed: Aug. 9, 2007

(65) Prior Publication Data

US 2008/0055044 A1 Mar. 6, 2008

Related U.S. Application Data

(60) Provisional application No. 60/824,159, filed on Aug. 31, 2006.

(51) Int. Cl.
*G08B 13/14* (2006.01)
(52) U.S. Cl. .......... 340/572.8; 340/572.7; 235/385; 235/375; 235/492; 428/40.1; 428/42.1; 428/204; 428/206
(58) Field of Classification Search ....... 340/572.8, 340/572.7; 235/385, 35; 428/40.1, 42.1, 428/204, 206
See application file for complete search history.

(56) References Cited

U.S. PATENT DOCUMENTS

| | | | |
|---|---|---|---|
| 5,528,222 A | 6/1996 | Moskowitz et al. | |
| 5,562,993 A * | 10/1996 | Hotta | 428/458 |
| 6,100,804 A | 8/2000 | Brady et al. | |
| 6,480,110 B2 | 11/2002 | Lee et al. | |
| 7,250,867 B2 * | 7/2007 | Sakama et al. | 340/572.7 |
| 7,435,467 B2 * | 10/2008 | Yang | 428/40.1 |
| 2005/0078006 A1 | 4/2005 | Hutchins et al. | |
| 2005/0164022 A1 | 7/2005 | Kliesch et al. | |
| 2006/0017571 A1 | 1/2006 | Arnold et al. | |

FOREIGN PATENT DOCUMENTS

| | | |
|---|---|---|
| JP | 11-277561 | 10/1999 |
| JP | 2003-44800 | 2/2003 |
| JP | 2004-240881 | 8/2004 |

(Continued)

OTHER PUBLICATIONS

"RFID Tags Fly With Airplane Parts", Elena Malykhina, Information Week [online], [available on the internet Nov. 22, 2004], [retrieved from the internet Jul. 26, 2006], URL: <http://www.informationweek.com/story/showArticle.jhtml?articleID=53701369>, 2 pages.

(Continued)

*Primary Examiner*—Tai T Nguyen
(74) *Attorney, Agent, or Firm*—Bradford B. Wright

(57) ABSTRACT

A flame resistant RFID tag comprises: a first flame resistant polymer film having a major surface; an RFID device secured to the major surface of the first flame resistant polymer film, the RFID device having proximal and distal surfaces and comprising an antenna electrically connected to an integrated circuit; and a first flame resistant pressure sensitive adhesive layer covering the distal surface of the RFID device. Methods of making the flame resistant RFID tags are also disclosed.

29 Claims, 1 Drawing Sheet

FOREIGN PATENT DOCUMENTS

| | | |
|---|---|---|
| JP | 2004-339495 A | 12/2004 |
| JP | 2005-190076 | 7/2005 |
| JP | 2006-037078 A | 2/2006 |

OTHER PUBLICATIONS

"Airbus Delivers Its RFID-Enabled, Next Generation Aircraft", Elena Malykhina, Information Week [online], [available on the internet Jan. 19, 2005], [retrieved from the internet Jul. 26, 2006], URL: <http://www.informationweek.com/story/showArticle.jhtml?articleID=57702262>, 2 pages.

Swan et al., "RFID Tag Including a Three-dimensional Antenna", U.S. Appl. No. 11/838,356, filed Aug. 14, 2007.

* cited by examiner

FLAME RESISTANT RFID TAG AND METHOD OF MAKING THE SAME

CROSS-REFERENCE TO RELATED APPLICATION

This application claims the benefit of U.S. Provisional Application No. 60/824,159, filed Aug. 31, 2006, the disclosure of which is incorporated herein by reference.

BACKGROUND

Radio-Frequency Identification (RFID) technology has become widely used in a large number of industries including, for example, transportation, manufacturing, waste management, postal tracking, airline baggage reconciliation, and highway toll management. A typical RFID system includes RFID tags, an RFID reader having an antenna, and a computing device. The RFID reader typically includes a transmitter that may provide energy or information to the tags, and a receiver to receive identity and other information from the tags. The computing device processes the information obtained by the RFID reader.

The transmitter outputs radio-frequency (RF) signals through the antenna to create an electromagnetic field that enables the tags to return an RF signal carrying the information. In some configurations, the transmitter initiates communication, and makes use of an amplifier to drive the antenna with a modulated output signal to communicate with the RFID tag. In other configurations, the RFID tag receives a continuous wave signal from the RFID reader and initiates communication by responding immediately with its information.

RFID tags may be active or passive. Active RFID tags include an internal power source, while passive RFID tags use RF energy received from the transmitter to power the RFID tag. In either case, the RFID tags communicate with the RFID reader using a pre-defined protocol, allowing the RFID reader to receive information from one or more tags. The computing device serves as an information management system by receiving the information from the RFID reader, and performing some action, such as updating a database or sounding an alarm. In addition, the computing device serves as a mechanism for programming data into the tags via the transmitter.

Typically, information received from RFID tags is specific to a particular application, but often provides identification for an article to which the tag is fixed such as a manufactured article, a vehicle, an animal or individual, or virtually any other tangible article. In various industries such as, for example, the commercial and civil aviation industries, there are various government mandated requirements concerning flame-resistance of materials used in that industry.

SUMMARY

In one aspect, the present invention provides an RFID tag comprising: a first flame resistant polymer film having a major surface; an RFID device secured to the major surface of the first flame resistant polymer film, the RFID device having proximal and distal surfaces and comprising an antenna electrically connected to an integrated circuit; and a first flame resistant pressure sensitive adhesive layer covering the distal surface of the RFID device, wherein the RFID tag is flame resistant.

In some embodiments, first flame resistant polymer film is chosen from a polyimide film, an organic polymer film containing an effective amount of a flame retardant, or a combination thereof.

In some embodiments, the first flame resistant pressure sensitive adhesive layer contacts the major surface of the first flame resistant polymer film.

In some embodiments, the RFID device is secured to the first flame resistant polymer film by an adhesive layer disposed between the proximal surface of the RFID device and the first flame resistant polymer film. The adhesive layer may or may not be flame resistant.

In some embodiments, the RFID tag further comprises a first release liner releasably adhered to the first flame resistant pressure sensitive adhesive layer.

In some embodiments, the proximal surface of the RFID device contacts the first flame resistant polymer film.

In some embodiments, the RFID device further comprises a carrier film that may or may not be flame resistant.

In some embodiments, the RFID tag further comprises a second flame resistant polymer film disposed on the first flame resistant pressure sensitive adhesive layer. In some embodiments, the second flame resistant polymer film is chosen from a polyimide film, an organic polymer film containing an effective amount of a flame retardant, or a combination thereof. In some embodiments, the RFID tag further comprises a second flame resistant pressure sensitive layer disposed on the second flame resistant polymer film. In some embodiments, the second flame resistant pressure sensitive adhesive layer comprises an effective amount of a flame retardant. In some embodiments, the RFID tag further comprises a release liner releasably adhered to the second flame resistant pressure sensitive layer.

In another aspect, the present invention provides a method of making an RFID tag, the method comprising:

providing a first flame resistant polymer film having a major surface;

securing an RFID device to the major surface of the first flame resistant polymer film, the RFID device having proximal and distal surfaces and comprising an antenna electrically connected to an integrated circuit; and covering the distal surface of the RFID device with a first flame resistant pressure sensitive adhesive layer, wherein the RFID tag is flame resistant.

RFID tags according to the invention may be lightweight, flame resistant, and suitable for use in the aviation industry.

As used herein:

the term "pressure sensitive adhesive" refers to an adhesive composition that possesses properties including the following: (1) aggressive and permanent tack, (2) adherence to a substrate with no more than finger pressure, (3) sufficient ability to hold onto the substrate, and (4) sufficient cohesive strength to be removed cleanly from the substrate; and the term "flame resistant" refers to any object that, if subjected to the Burn Test (below) has an average burn length of less than or equal to 8 inches (20 cm) and has an average flame time after removal of the flame source of less than or equal to 15 seconds and drippings from the test specimens may not continue to flame for more than an average of 5 seconds after falling.

The Burn Test is set forth as follows:

(1) Conditioning: Specimens must be conditioned to 70±5° F. (21±2.7° C.), and at 50 percent±5 percent relative humidity until moisture equilibrium is reached or for 24 hours.

(2) Specimen configuration: The portion of the specimen tested must be a rectangular area at least 2 inches (5 cm) wide and 12 inches (30 cm) long. Specimens must be mounted vertically with opposite sides exposed in a metal frame so that the two long edges (vertically oriented, 12 inches (30 cm)) and the upper edge (2 inches (5 cm)) of the specimen(s) are held securely. The bottom edge of the specimen must be horizontal, unsupported, have a straight edge. The space between the flame and the bottom edge of the specimen must be free of obstruction(s).

Specimens must be tested either as an entire object or, if the RFID tag is smaller than the required 2 inches (5 cm) by 12 inches (30 cm) test sample, the specimen shall be made from a representative sample of the material, for example, sheets of material on which RFID tags are manufactured could be used for testing before the individual RFID tags are cut. If no sufficiently large section of material is available smaller specimens must be overlapped by ⅛ inch (3 mm) or less as mounted in the metal frame to form a continuous uninterrupted surface over the test area, and, if an antenna is present on the smaller specimens, the primary axis of the antennas should be oriented in the same direction.

In the case of an RFID tag, tests must be conducted on the RFID tags with the primary axis of the antenna(s) oriented vertically and then the test is repeated with the primary axis of the antenna(s) oriented horizontally. If the specimen passes the test in any orientation it is considered to have passed the burn test, regardless of any failures in other orientations. If the sample is isotropic (e.g., circular antennas, film with no antenna etc), then the orientation is not critical and specimen only needs to be tested in one orientation.

(3) Apparatus: Tests must be conducted in a draft-free cabinet in accordance with Federal Test Method Standard 191 Model 5903 (revised Method 5902) for the vertical test.

(4) Vertical test: A minimum of three specimens must be tested and results averaged. Each specimen must be supported vertically.

The specimen must be exposed to a Bunsen or Tirrill burner with a nominal 0.375-inch (9.5 mm) I.D. tube adjusted to give a flame of 1.5 inches (38 mm) in height. The minimum flame temperature measured by a calibrated thermocouple pyrometer in the center of the flame must be 1550° F. (843° C.). The lower edge of the specimen must be 0.75-inch (19 mm) above the top edge of the burner. The flame must be applied to the center line of the lower edge of the specimen. The flame must be applied for 12 seconds and then removed. Flame time, burn length, and flaming time of drippings, if any, are be recorded. The burn length is determined as defined below.

(5) Burn length: Burn length is the distance from the original edge to the farthest evidence of damage to the test specimen due to flame impingement, including areas of partial or complete consumption, charring, or embrittlement, but not including areas sooted, stained, warped, or discolored, nor areas where material has shrunk or melted away from the heat source.

(6) Results: In order for an RFID tag to pass the Burn Test, the average burn length may not exceed 8 inches (20 cm), the average flame time after removal of the flame source may not exceed 15 seconds, and drippings from the test specimens may not continue to flame for more than an average of 5 seconds after falling.

DETAILED DESCRIPTION

Figure 1:
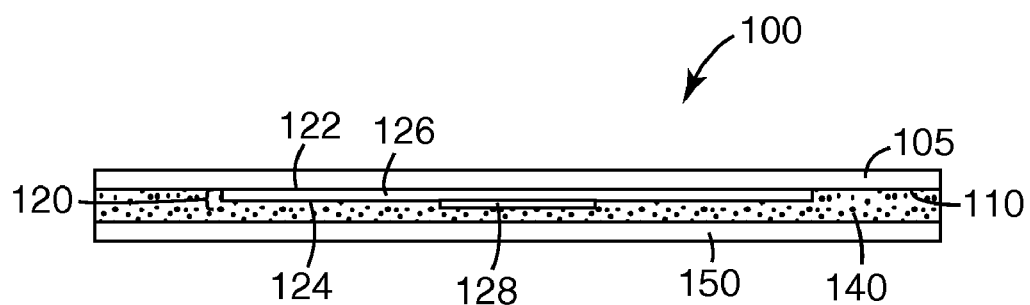
FIG. 1 is a schematic side view of an exemplary embodiment according to the present invention.

FIG. 1 shows one exemplary embodiment of an RFID tag 100 according to the present invention. Flame resistant polymer film 105 has major surface 110. RFID device 120 has proximal and distal surfaces 122, 124, respectively, and comprises antenna 126 electrically connected to integrated circuit 128. Antenna 126 is physically deposited on major surface 110 and secures RFID device 120 to major surface 110. Flame resistant pressure sensitive adhesive layer 140 is adhered to RFID device 120 and contacts major surface 110. Flame resistant pressure sensitive adhesive layer 140 covers distal surface 124 of RFID device 120. Optional release liner 150 is releasably adhered to pressure sensitive adhesive layer 140. In use, optional release liner 150 is typically removed to expose flame resistant pressure sensitive adhesive layer 140 which may then be adhered to a desired substrate.

Figure 2:
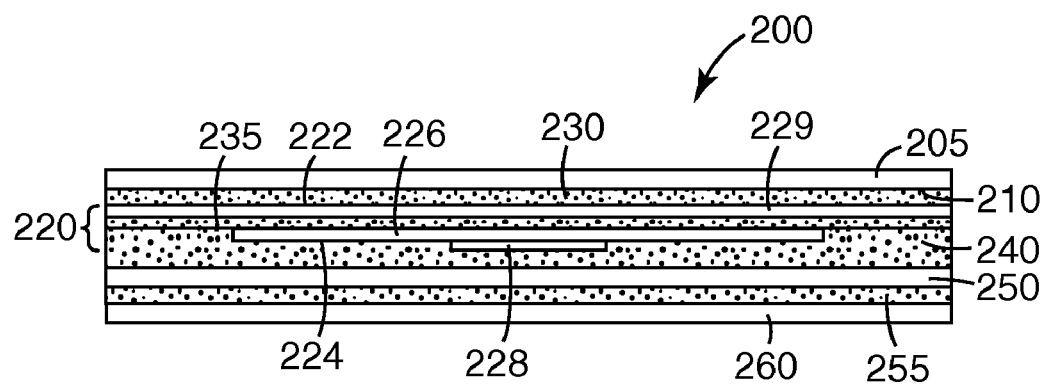
FIG. 2 is a schematic side view of an exemplary embodiment according to the present invention.

FIG. 2 shows one exemplary embodiment of an RFID tag 200 according to the present invention. First flame resistant polymer film 205 has major surface 210. RFID device 220 has proximal and distal surfaces 222, 224, respectively, and has antenna 226 electrically connected to integrated circuit 228, adhesive layer 235 and carrier film 229. Antenna 226 is secured to carrier film 229 by adhesive layer 235. Second flame resistant pressure sensitive 230 secures RFID device 220 to major surface 210. First flame resistant pressure sensitive adhesive layer 240 is adhered to RFID device 220 and major surface 210 such that first flame resistant pressure sensitive adhesive layer 240 covers distal surface 224 of RFID device 220. Second flame resistant polymer film 250 is disposed on first flame resistant pressure sensitive adhesive layer 240. Third flame resistant pressure sensitive adhesive layer 255 is disposed on second flame resistant polymer film 250. Optional release liner 260 is releasably adhered to third flame resistant pressure sensitive adhesive layer 255. In use, optional release liner 260 is typically removed to expose third flame resistant pressure sensitive adhesive layer, which may then be adhered to a desired substrate.

Examples of flame resistant polymer films that may be used include polyimide films and organic polymer films (e.g., fluoropolymer films, polyester films, polyamide films, cellulose ester films, and polyolefin films) having an effective amount of a flame retardant (i.e., a sufficient amount to render the organic polymer film flame resistant). While the various flame resistant polymer films may have any thickness, they typically have a thickness of from about 0.001 to 2 millimeters (mm). More typically, they may have a thickness of less than 1 mm, less than 0.5 mm, or even less than 0.2 mm.

Examples of useful flame retardants for inclusion in flame resistant polymer films and pressure sensitive adhesives used in the present invention include phosphate flame retardants (e.g., tris-(halogenated alkyl) phosphate such as tris-(2,3-dibromopropyl) phosphate, phosphate salts of polyols such as pentaerythritol), antimony trioxide, phosphazenes, halogenated polynuclear aromatic ethers (e.g., decabromodiphenyl oxide).

Commercially available flame retardants include, for example, flame retardants marketed by Great Lakes Chemical Corp., Indianapolis, Ind., such as bromine-based flame retardants (e.g., under the trade designation "FIREMASTER", phosphorus-based flame retardants (e.g., under the trade designations "REOGARD", "REOFOS", and "KRONITEX"), and antimony-base flame retardants (e.g., under the trade designations "TIMONOX", "TMS", "TRUTINT", "MICROFINE", "ULTRAFINE", "PYROBLOC" and "FIRESHIELD").

If present, the adhesive layer that adheres the RFID device to the first flame resistant polymer film may comprise any adhesive material, regardless of flame resistance. Examples include pressure sensitive adhesives (e.g., acrylic pressure sensitive adhesives), hot melt adhesives, and/or thermosetting adhesives (e.g., epoxies). The adhesive layer may be formed by conventional methods such as, for example, by spray coating, bar coating, knife coating, roll coating, adhesive transfer, and combinations thereof.

Flame resistant pressure sensitive adhesives may be based on a flame resistant pressure sensitive material in its own right (e.g., at least some silicone pressure sensitive adhesives), or it may contain an effective amount of flame retardant (i.e., a sufficient amount to render the pressure sensitive adhesive flame resistant). Examples of useful pressure sensitive adhesives include acrylic pressure sensitive adhesives, silicone pressure sensitive adhesives, and urethane pressure sensitive adhesives. Flame resistant pressure sensitive adhesive layer may be formed by conventional methods such as, for example, by spray coating, bar coating, knife coating, roll coating, adhesive transfer, and combinations thereof. While the various flame resistant pressure sensitive adhesive layers may have any thickness, they typically have a thickness of from about 0.001 to 2 millimeters (mm). More typically, they may have a thickness of less than 1 mm, less than 0.5 mm, or even less than 0.2 mm. Useful commercially available pressure sensitive adhesives include an acrylic pressure sensitive adhesive transfer tape marketed under the trade designation "9372 DK" by 3M Company, St. Paul, Minn.

Optional release liners may be any suitable release liner. Examples include silicone treated papers and polyolefin liners (e.g., polypropylene liners).

The RFID device comprises an antenna electrically connected to an integrated circuit. The RFID device may be, for example, passive or active.

Passive RFID devices have no internal power supply. The minute electrical current induced in the antenna by the incoming radio frequency signal provides just enough power for the integrated circuit in the device to power up and transmit a response. Most passive tags signal by backscattering a carrier signal from a reader. This means that the aerial (antenna) has to be designed to both collect power from the incoming signal and also to transmit the outbound backscatter signal. The response of a passive RFID device is not limited to just an ID number (e.g., globally unique identifier (GUID)); the integrated circuit can contain nonvolatile electrically erasable programmable read only memory (EEPROM) for storing data.

Unlike passive RFID devices, active RFID devices have their own power source which is used to power any integrated circuits that generate the outgoing signal. Active devices, due to their onboard power supply, transmit at higher power levels than passive devices, allowing them to be more effective in "RF challenged" environments like water (including humans/cattle, which are mostly water), metal (shipping containers, vehicles), or at longer distances.

RFID tags according to the present invention are typically used as a component of a system including: devices, device readers, edge servers, middleware, and application software.

The antenna, which should be capable of receiving RF and/or microwave signals, should typically be supported by a dimensionally stable support member (e.g., a carrier film or the first flame resistant polymer film). The antenna may be deposited, for example, by metal sputtering or printing (e.g., with conductive ink) directly onto the support member or it may be secured to the support member with an adhesive (e.g., epoxy). In the latter instance, a copper sheet may be adhered with epoxy resin to the support member, and then portion(s) of the copper etched away to give a desired antenna shape. The integrated circuit is electrically connected to the antenna (e.g., with solder or conductive adhesive).

Various active or passive RFID devices are known in the RFID art, and many types of antenna and integrated circuit are commercially available, for example, on a carrier film (e.g., polyester or polyimide). Selection of a particular combination of antenna and integrated circuit will typically be influenced by considerations such as, for example, the intended use and price.

Optionally, a writable layer may be secured to at least a portion of the exterior surface of RFID tags according to the present invention. Examples of writable layers include papers, ink receptive films, laser-writable filled polymers, and ceramic coatings.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight.

Adhesive transfer tape marketed under the trade designation "9372 DK" by 3M Company, St. Paul, Minn., passes the Burn Test described herein.

Polyimide films, 0.002-inch (50 micrometers) thick, having the trade designation "KAPTON H", available from E.I. du Pont de Nemours and Co., Wilmington, Del., passes the Burn Test described herein.

Comparative Example 1

A dry polyester (PET) inlay with squiggle antenna pattern (having the trade designation "SQUIGGLE", available from Alien Technologies, Morgan Hill, Calif., part #1850032-001 supplied in roll form), was tested with no pressure sensitive adhesive layer. This commercial "SQUIGGLE" inlay as supplied includes a thin epoxy adhesive bonding the copper to the polyester. This inlay part number also includes an IC chip. The dimensions of the specimen tested was greater than 2 inches (5 cm)×12 inches (30 cm), cut from a roll of inlays 6 inches (15 cm) wide. The inlay was tested in both antenna orientations in accordance with the Burn Test.

Comparative Example 2

RFID "squiggle" tags were cut from the inlay roll from Comparative Example 1. They were cut in such a way to minimize the amount of PET in the sample. These trimmed inlays was attached to a 0.002 inch (50 micrometers) thick sheet of polyimide film 3 inches (8 cm) by 12 inches (30 cm) (having the trade designation "KAPTON H", available from E.I. du Pont de Nemours and Co., Wilmington, Del.) using a flame resistant acrylic adhesive transfer tape marketed under the trade designation "9372 DK" by 3M Company, St. Paul, Minn.). The antennas were placed such that they were spaced between each other by 0.25 inch (6 mm). A second layer of 3M Company 9372 DK adhesive transfer tape was then applied over the first adhesive layer to encapsulate the RFID "squiggle" tags. Two Burn Tests were conducted, one with the major axis of the antenna oriented vertical and the other with the major axis of the antenna oriented horizontally Example 1

An 0.002 inch (50-micrometer) thick sheet of polyimide film (having the trade designation "KAPTON H", available from DuPont, Wilmington, Del.), was etched to form single dipole copper antennas each occupying an area 3 inches (8 cm) long and 0.75 inch (19 mm) wide, spaced 2 inches (5 cm) apart. A Phillips SL3ICS3001FTT UCODE EPC G2 RFID chip (available from Koninklijke Philips Electronics N.V., Groenewoudseweg 1, 5621 BA, Eindhoven, Netherlands) was attached to the substrate. The polyimide film was cut into strips at least 3 inches (8 cm) wide and 12 inches (30 cm) long. Specimens were prepared with the primary axes of the antenna oriented vertically and horizontally in accordance with the Burn Test. Each sample was laminated with "9372 DK" adhesive transfer tap on the side with the antenna and integrated circuit. The samples were then tested in accordance with the Burn Test.

Example 2

The construction of Comparative Example 2 was used, but with a second sheet of 0.002 inch (50 micron) thick sheet of polyimide film (having the trade designation "KAPTON H", available from DuPont, Wilmington, Del.) adhered to the second layer of the adhesive transfer tape to encapsulate the PET inlay between the two layers of polyimide. A third layer of "9372 DK" adhesive transfer tape was applied to the outside of the second layer of polyimide film. Two tests were conducted in accordance with the Burn Test, one with the major axis of the antenna oriented vertical and the other with the major axis of the antenna oriented horizontally.

TABLE 1

|  | BURN TEST Pass/Fail |
|---|---|
| Comparative Example 1 | Fail |
| Comparative Example 2 | Fail (vertical orientation) Fail (horizontal orientation) |
| Example 1 | Pass |
| Example 2 | Pass |

Various modifications and alterations of this invention may be made by those skilled in the art without departing from the scope and spirit of this invention, and it should be understood that this invention is not to be unduly limited to the illustrative embodiments set forth herein.

What is claimed is:

1. An RFID tag comprising:
   a first flame resistant polymer film having a major surface;
   an RFID device secured to the major surface of the first flame resistant polymer film, the RFID device having proximal and distal surfaces and comprising an antenna electrically connected to an integrated circuit; and
   a first flame resistant pressure sensitive adhesive layer covering the distal surface of the RFID device, wherein the RFID tag is flame resistant.

2. The RFID tag of claim 1, wherein the first flame resistant polymer film is chosen from a polyimide film, an organic polymer film containing an effective amount of a flame retardant, or a combination thereof.

3. The RFID tag of claim 1, wherein the first flame resistant pressure sensitive adhesive layer contacts the major surface of the first flame resistant polymer film.

4. The RFID tag of claim 1, wherein the RFID device is secured to the first flame resistant polymer film by an adhesive layer disposed between the proximal surface of the RFID device and the first flame resistant polymer film.

5. The RFID tag of claim 4, wherein the adhesive layer is flame resistant.

6. The RFID tag of claim 5, further comprising a release liner releasably adhered to the first flame resistant pressure sensitive adhesive layer.

7. The RFID tag of claim 1, wherein the proximal surface of the RFID device contacts the first flame resistant polymer film.

8. The RFID tag of claim 1, wherein the RFID device further comprises a carrier film.

9. The RFID tag of claim 8, wherein the carrier film is flame resistant.

10. The RFID tag of claim 8, further comprising a second flame resistant polymer film disposed on the first flame resistant pressure sensitive adhesive layer.

11. The RFID tag of claim 1, further comprising a second flame resistant polymer film disposed on the first flame resistant pressure sensitive adhesive layer.

12. The RFID tag of claim 11, wherein the second flame resistant polymer film is chosen from a polyimide film, an organic polymer film containing an effective amount of a flame retardant, or a combination thereof.

13. The RFID tag of claim 11, further comprising a second flame resistant pressure sensitive layer disposed on the second flame resistant polymer film.

14. The RFID tag of claim 13, wherein the second flame resistant pressure sensitive adhesive layer comprises an effective amount of a flame retardant.

15. The RFID tag of claim 13, further comprising a release liner releasably adhered to the second flame resistant pressure sensitive layer.

16. A method of making an RFID tag, the method comprising:
   providing a first flame resistant polymer film having a major surface;
   securing an RFID device to the major surface of the first flame resistant polymer film, the RFID device having proximal and distal surfaces and comprising an antenna electrically connected to an integrated circuit; and
   covering the distal surface of the RFID device with a first flame resistant pressure sensitive adhesive layer, wherein the RFID tag is flame resistant.

17. The method of claim 16, wherein the first flame resistant polymer film is chosen from a polyimide film, an organic polymer film containing an effective amount of a flame retardant, or a combination thereof.

18. The method of claim 16, wherein the first flame resistant pressure sensitive adhesive layer contacts the major surface of the first flame resistant polymer film.

19. The method of claim 16, wherein the RFID device is secured to the first flame resistant polymer film by an adhesive layer disposed between the proximal surface of the RFID device and the first flame resistant polymer film.

20. The method of claim 19, wherein the adhesive layer is flame resistant.

21. The method of claim 16, wherein the RFID tag further comprises a first release liner releasably adhered to the first flame resistant pressure sensitive adhesive layer.

22. The method of claim 16, wherein the proximal surface of the RFID device contacts the first flame resistant polymer film.

23. The method of claim 16, wherein the RFID device further comprises a carrier film.

24. The method of claim 23, wherein the carrier film is flame resistant.

25. The method of claim 16, wherein the RFID tag further comprises a second flame resistant polymer film disposed on the first flame resistant pressure sensitive adhesive layer.

26. The method of claim 25, wherein the second flame resistant polymer film is chosen from a polyimide film, an organic polymer film containing an effective amount of a flame retardant, or a combination thereof.

27. The method of claim 25, wherein the RFID tag further comprises a second flame resistant pressure sensitive layer disposed on the second flame resistant polymer film.

28. The method of claim 27, wherein the second flame resistant pressure sensitive adhesive layer comprises an effective amount of a flame retardant.

29. The method of claim 27, wherein the RFID tag further comprises a second release liner releasably adhered to the second flame resistant pressure sensitive layer.

* * * * *